United States Patent [19]

Stolka et al.

[11] 4,007,043
[45] Feb. 8, 1977

[54] PHOTOCONDUCTIVE ELEMENTS WITH COPOLYMER CHARGE TRANSPORT LAYERS

[75] Inventors: Milan Stolka, Fairport; Sam R. Turner, Webster, both of N.Y.

[73] Assignee: Xerox Corporation, Stamford, Conn.

[22] Filed: July 16, 1975

[21] Appl. No.: 596,531

[52] U.S. Cl. .................. 96/1 PC; 96/1.5; 526/245; 526/249; 526/282; 526/310; 526/326

[51] Int. Cl.² ............ G03G 5/04; G03G 5/06

[58] Field of Search ............ 96/1.5, 1 PC; 260/85.5 R, 85.5 A, 86.1 E, 86.1 N, 93.5 C

[56] References Cited

UNITED STATES PATENTS

| 3,418,116 | 12/1968 | Inami et al. | 96/1.5 |
| 3,764,590 | 10/1973 | Mukoh et al. | 260/85.5 R |
| 3,779,750 | 12/1973 | Merrill et al. | 96/1.5 |
| 3,884,690 | 5/1975 | Radler | 96/1.5 |
| 3,912,506 | 10/1975 | Merrill | 96/1.5 |
| 3,923,762 | 12/1975 | Stolka et al. | 260/93.5 C X |
| 3,928,034 | 12/1975 | Regensburger | 96/1.5 |

Primary Examiner—Roland E. Martin, Jr.
Attorney, Agent, or Firm—James J. Ralabate; James Paul O'Sullivan; John H. Faro

[57] ABSTRACT

Method for achieving free radical initiated copolymerization of an addition monomer having pendant therefrom a strong donor group with an addition monomer having pendant therefrom a strong acceptor group.

Copolymers prepared according to this method can be represented by the following formula:

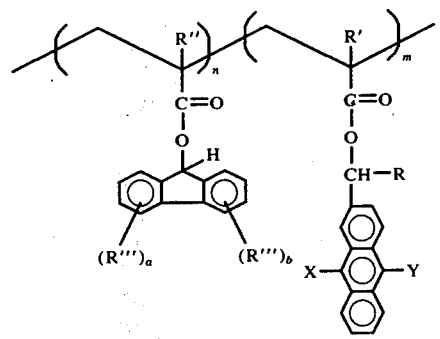

wherein
R is hydrogen or methyl;
R' is hydrogen or methyl;
R" is hydrogen or methyl;
R'" is selected from the group consisting of —NO₂, halogen, —CN and —CF₃;
X and Y are independently selected from the group consisting of hydrogen, chlorine, bromine, alkyl of 1 – 4 carbon atoms and phenyl;
a and b can range from 0 – 4; and
n and m can range from about 5 to about 95 percent.

The polymeric compositions prepared according to this method are suitable for use in electrophotography either alone as the primary photoresponsive entity or in combination with other photoconductive materials.

10 Claims, No Drawings

PHOTOCONDUCTIVE ELEMENTS WITH COPOLYMER CHARGE TRANSPORT LAYERS

FIELD OF THE INVENTION

This invention relates to a method for preparation of polymeric compositions and the use of these compositions in electrophotographic elements and processes. More specifically, this invention involves random copolymers suitable for use in electrophotographic imaging members and processes. The spacial constraint, relative conformation, relative ionization potential and relative electron affinity of the pendant groups of the two principal components of these compositions favors charge transfer interaction between them, resulting in highly colored polymeric materials.

DESCRIPTION OF THE PRIOR ART

The formation and development of images on the imaging surfaces of photoconductive materials by electrostatic means is well known. The best known of the commerical processes, more commonly known as xerography, involves forming a latent electrostatic image on an imaging surface of an imaging member by first uniformly electrostatically charging the surface of the imaging layer in the dark and then exposing this electrostatically charged surface to a light and shadow image. The light-struck areas of the imaging layer are thus rendered relatively conductive and the electrostatic charge selectively dissipated in these irradiated areas. After the photoconductor is exposed, the latent electrostatic image on this image-bearing surface is rendered visible by development with a finely divided colored marking material known in the art as "toner." This toner will be principally attracted to those areas on the image-bearing surface having a polarity of charge opposite to the charge on the toner particles, thus forming a visible powder image.

The developed image can then be read or permanently affixed to the photoconductor where the imaging layer is not to be reused. This latter practice is usually followed with respect to the binder-type photoconductive films (e.g. ZnO dispersed in a resinous binder) where the photoconductive imaging layer is also an integral part of the finished copy.

In so-called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well known techniques can be used to permanently affix the toner image to the copy sheet, including overcoating with transparent films, and solvent or thermal fusion of the toner particles to the supportive substrate.

In the above plain paper copying system, the materials used in the photoconductive layer should preferably be capable of rapid switching from insulating to conductive to insulating state in order to permit cyclic use of the imaging surface. The failure of a material to return to its relatively insulating state prior to the succeeding charging sequence will result in a decrease in the maximum charge acceptance of the photoconductor. This phenomenon, commonly referred to in the art as "fatigue," has in the past been avoided by the selection of photoconductive materials possessing rapid switching capacity. Typical of the materials suitable for use in such a rapidly cycling system include anthracene, sulfur, selenium and mixtures thereof (U.S. Pat. No. 2,297,691); selenium being preferred because of its superior photosensitivity.

In addition to anthracene, other organic photoconductive materials, most notably, poly(N-vinylcarbazole), have been the focus of increasing interest in electrophotography. Most organic photoconductive materials, however, including poly(N-vinylcarbazole), lack the inherent photosensitivity to be competitive with selenium. This need for the enhancement of the photoresponse characteristics of organic photoconductors thus led to the formulation of these organic materials with other compounds, commonly referred to as "activators." Poly(vinylcarbazoles), for example, when sensitized with 2,4,7-trinitro-9-fluorenone exhibit good photoresponse and discharge characteristics and, (depending upon the polarity of the surface charge), low dark decay; U.S. Pat. No. 3,484,237. Other organic resins, traditionally considered nonphotoconductive can also be sensitized with certain activators, such as Lewis Acids, thus forming charge transfer complexes which are photoresponsive in the visible band of the spectrum, U.S. Pat. Nos. 3,408,181; 3,408,182; 3,408,183; 3,408,184; 3,408,185; 3,408,186; 3,408,187; 3,408,188; 3,408,189; and 3,408,190. With respect to both the photoconductive and nonphotoconductive resins, the degree of sensitization is generally concentration dependent; the higher the loadings of activators, the greater the photoresponse.

The concentration of activator capable of formulation with the above materials, however, is finite; generally being limited to less than 10 weight percent of the composition. Ordinarily, the addition of high loadings of activator to many of the above materials will lead to impairment of mechanical and/or the photoconductive properties of the sensitized composition. In most instances, the excessive addition of activators to both the photoconductive and nonphotoconductive materials of the types disclosed in the above patents will result in crystallization of these activators, thus impairing the mechanical strength and other physical properties of the resultant photoconductive composition. Still yet other sensitizers, when present in relatively low concentration can result in oversensitization of the composition in that the photocurrent generated upon exposure will persist long after illumination ceases, BUL. CHEM. SOC. OF JAP. 39, 1660 (1966). This phenomenon prevents the further use of such materials for preparation of successive electrostatic reproductions until such persistent conductivity is dissipated in the previously illuminated areas of the photoconductor. The dissipation of persistent photocurrents generally takes an extended period of time and/or thermal erasure, thus making these oversensitized compositions generally unsatisfactory for rapid cycling electrostatographic imaging systems.

As an alternative to the more traditional type of sensitization discussed above, Inami and Morimoto have proposed preparation of "intramolecular" charge transfer complexes (more properly characterized as "intrachain" charge transfer complexes) wherein electron donor and electron acceptor substituents are located along a common vinyl backbone, U.S. Pat. No. 3,418,116. The materials of principal interest disclosed in the above patent are the nitrated polymers of polyacenaphthylene, poly-9-vinylcarbazole and poly-1-vinylnaphthalene. Intrachain charge transfer complexes have also been disclosed by Podhajny (U.S. Pat. No. 3,697,264) and Limburg (U.S. Pat. No. 3,877,936). All of the intrachain charge transfer complexes disclosed to date comprise relatively strong electron donor structural units and relatively weak electron acceptor structural units. Attempts at preparation of monomers having strong electron acceptor groups (groups having an electron affinity in excess of about 0.7 electron volts) have up to now been generally unsuccessful. Even in the limited instances where it has been possible to prepare such monomers, polymerization of these monomers by free radical initiation has been virtually impossible, since the electron acceptor moiety quenches the free radical. Introduction of strong electron acceptor substituents onto preformed polymer backbones has also encountered considerable difficulty. For example, attempts at nitration of poly(-vinylfluoroenone) results in degradation in the polymer chain and reduction in its solubility in common solvents (presumably due to cross-linking).

Accordingly, it is the object of this invention to remove the above as well as related deficiencies in the prior art.

More specifically, it is the object of this invention to provide a method for enhancement of electron donor and electron acceptor interaction so as to increase the probability of charge transfer complex formation.

It is primary object of this invention to provide a method and means for achieving free radical initated copolymerization of an addition monomer having pendant therefrom strong electron donor groups with an addition monomer having pendant therefrom strong electron acceptor groups.

It is another object of this invention to provide a polymeric composition capable of formation of an intrachain charge transfer complex.

It is yet another object of this invention to provide a copolymer composition having a random distribution of relatively strong electron acceptor and relatively strong electron donor structural units.

Additional objects of this invention include dilution of the above random copolymer so as to minimize charge transfer interaction and yet maintain the ambipolar transport properties of the composition.

SUMMARY OF THE INVENTION

The above and related objects are achieved by providing a method for performing free radical initiated copolymerization of an addition monomer having pendant therefrom a strong electron donor group with an addition monomer having pendant therefrom a strong electron acceptor group. According to this method, acrylate or methacrylate substituents are formed on a strong electron donor group and a strong electron acceptor group respectively, the acrylate or methacrylate monomers thus prepared combined in a suitable solvent and their copolymerization initiated by the free radicals. Copolymers prepared in the manner described above are highly colored due to the formation of an intrachain charge transfer complex between the strong donor and strong acceptor groups pendant from the copolymer backbone. These copolymers are represented by the following formula:

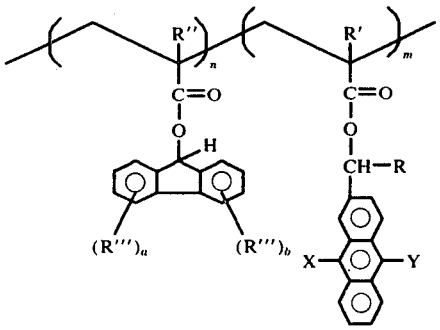

wherein R is hydrogen or methyl;
R' is hydrogen or methyl;
R'' is hydrogen or methyl;
R''' is selected from the group consisting of $-NO_2$, halogen, $-CN$ and $-CF_3$;
X and Y are independently selected from the group consisting of hydrogen, chlorine, bromine, alkyl of 1 – 4 carbon atoms and phenyl;
$a$ and $b$ can range from 0 – 4; and
$n$ can range from about 5 to about 95 percent of the total number of structural units of the copolymer; and
$m$ can range from about 5 to about 95 percent of the total number of structural units of the copolymer.

DESCRIPTION OF THE INVENTION INCLUDING PREFERRED EMBODIMENTS

The copolymers of this invention are prepared by the standard free radical initiated copolymerization of an anthracenic functional monomer with a 9-fluorenyl functional monomer. Anthracenic functional monomers suitable for use in preparation of these copolymers are defined by the following formula:

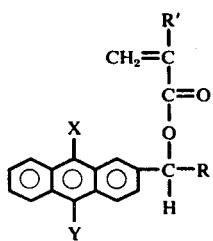

wherein R, R', X and Y are as previously defined.

These anthracenic functional monomers can be prepared by acylation of anthracene or a substituted anthracene, at the 2-position followed by reduction of the acylated anthracene to the corresponding alcohol. This alcohol can thereafter be condensed with an acryloyl halide or an alphaalkylacryloyl halide, thereby forming a monomer having the structure set forth hereinabove.

The 9-fluorenyl or substituted 9-fluorenyl monomers suitable for use in preparation of copolymers of this invention have the following formula:

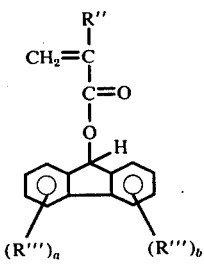

wherein R", R''', a and b are as previously defined.

These monomers can be prepared by reacting a 9-hydrazone derivative of fluorenone or a 9-hydrazone derivative of a substituted fluorenone under oxidizing conditions, thereby converting the hydrazone to the corresponding 9-diazo compound. This 9-diazo compound is subsequently contacted with an alpha alkyl substituted acrylic acid and the esterification of these two ingredients catalyzed by the introduction of a Lewis acid.

After the individual monomers have been prepared in the manner described above, they can be combined in a suitable solvent, such as acetone, and a conventional free radical initiator subsequently added to the monomer charge. The copolymerization of these materials can thereafter procede in the conventional manner. The copolymeric product which is produced from these materials can be precipitated in an alcohol, such as methanol, and thereafter purified in the conventional manner. Analysis of the copolymer products produced in the manner described above indicates that the concentration of donor and acceptor units in the copolymer corresponds to the original concentration of the monomers in the charge prior to polymerization. The sequence distribution of the structural units in the copolymer appears to be random.

The copolymers prepared in the manner described above are highly colored and, therefore, sensitive to light in the visible region of the electromagnetic spectrum. These copolymers can be used as photoconductors in electrophotographic imaging members and methods. The intensity of charge transfer interaction between the electron donor and electron acceptor groups of this copolymer can be reduced and thus the color of the copolymer by simple dilution of the frequency of charge transfer interaction. This achieved by introduction of a third monomer into the charge prior to copolymerization of the electron acceptor functional monomer with the electron donor functional monomer. This third monomer is preferably electronically inert, that is substantially incapable of forming a charge transfer complex with either the structural unit having pendant therefrom the strong electron donor material or the structural unit having a pendant therefrom the strong electron acceptor. By thus increasing the spacing between such electronically active structural units, the frequency of charge transfer interaction is reduced and consequently the color of the polymeric material. Generally, anywhere from 5 to 30 mole percent of electronically inert monomer can be added to the charge containing the electronically active monomers. From about 5 to about 90 percent structural units of each of the electronically active monomers are included in the polymer. Although the extent of charge transfer interaction within this diluted copolymer is reduced, it still retains its ability to effectively transport both holes and electrons, which are injected into it, irrespective of the source of charge carriers. This diluted copolymer can, therefore, be used as a charge transport matrix. This matrix can be used as a binder for other photoconductive materials or in composite photoconductive films wherein one layer of the composite is primarily responsible for photogeneration of charge carriers and the second layer of the composite is primarily responsible for transport of the photogenerated charge carriers which are injected into it from the photoresponsive layer contiguous therewith. Due to the presence of both electron donor and electron acceptor groups in this copolymer, this material is suitable for use as an ambipolar charge transport matrix. The efficiency with which an ambipolar matrix transports both species of charge carriers is, of course, dependent upon the proximity of matching of the energy levels of (a) the electronical vacancy created upon photoexcitation of the photoconductive material with the energy level of the hole transport level and associated with the donor groups of the polymeric composition; and (b) the energy level occupied by the electrons generated upon photoexcitation of the photoconductive materials with the energy level of the electron transport level associated with the acceptor group of the polyermic composition. The efficient transport of both species of charge carriers within such a matrix (especially when the photoconductive pigment is dispersed in the matrix) presumes that the materials dispersed in the matrix do not themselves trap either species of charge carrier.

The Examples which follow further define, describe and illustrate preparation and use of the copolymers of this invention. Techniques and equipment in the preparation and evaluation of such copolymers are standard or as hereinbefore described. Parts and percentages appearing in such examples are by weight unless otherwise stipulated.

EXAMPLE I

Preparation of poly(1-(2-anthryl)-ethyl methacrylate)

About 0.84 moles (150 grams) of anthracene is dispersed in 150 milliliters nitrobenzene. This dispersion is prepared in a reaction vessel equipped with an addition funnel, a thermometer, a source of nitrogen gas and a magnetic stirring bar. The dispersion is chilled to about 15° C. In a separate container about 1.9 moles (255 grams) of aluminum chloride is dissolved in 480 milliliters nitrobenzene. About 1.6 moles (155 milliliters) acetic anhydride is added to the aluminum chloride solution by dropwise addition. The aluminum chloride solution is rapidly agitated during such addition. The temperature of this solution is carefully monitored since the formation of the complex between the aluminum chloride and the acetic anhydride is strongly exothermic. Subsequent to formation of this complex, it is transferred to the addition funnel. The reaction vessel containing the anthracene dispersion is purged of air with nitrogen, the anthracene dispersion vigorously agitated and the aluminum chloride/acetic anhydride complex added dropwise over a period of about 60 minutes. The temperature of the anthracene dispersion is maintained at 15° C during the addition of this complex. About 5 hours after completion of addition of the complex to the anthracene dispersion, the reaction of these materials is quenched by the addition of 1500 milliliters of cold, dry benzene (cooled to ~8° C.). The reaction vessel is chilled in an ice bath after the addition of benzene and maintained at this temperature for approximately 4 hours. The red solids formed during this reaction are separated from the reaction mass by filtration, washed with additional amounts of dry benzene and hexane for removal of nitrobenzene residues from the solid. The filtration and subsequent washing of the recovered solid should be preformed in a low humidity environment in order to prevent premature hydrolysis of the recovered solid product. Subsequent to removal of residual traces of nitrobenzene from this product, it is hydrolyzed in an aqueous solution of hydrochloric acid (200 milliliters of concentrated HCl per 2 liters distilled water). The solids are then recovered by filtration, washed continuously with distilled water until all traces of acidity are removed, dried in a vacuum oven and purified by recrystallization from a benzene/hexane (1:1) solvent mixture. The recovered product, 2-acetyl anthracene, is light-green in appearance. Yield: 98 grams, M.P. 188° C.

About 53 grams of 2-acetyl anthracene is dispersed in 1,800 milliliters of ethanol, the dispersion heated to boiling under reflux conditions and 25 grams of sodium borohydride in 280 milliliters distilled water added by dropwise addition. During the addition of the sodium borohydride, the dispersion is maintained in a constant state of mild agitation. With the addition of about two-thirds of the sodium borohydride solution, the dispersed matter dissolves in the solvent and turns brown in color. Upon completion of additon of the sodium borohydride, the resulting solution is heated under reflux conditions for an additional two hours. At this time, the reflux condensor is opened and approximately ⅔ of the volatile solvent contained within the mixture allowed to escape. The product remaining in the reaction vessel is isolated from excess sodium borohydride by hydrolysis with an aqueous solution of hydrochloric acid (200 milliliters HCl per two liters of distilled water). Upon precipitation of the isolated product, it is filtered, washed with alternate solutions of aqueous hydrochloric acid and distilled water, dried and recrystallized from benzene. The recovered product, 1-(2-anthryl) ethanol, is white in color. Yield: 50 grams, M.P. 164° C.

About 50 grams of 1-(2-anthryl) ethanol is dissolved in 375 milliliters of dioxane. To this solution is subsequently added 37.5 milliliters of triethylamine and 27.5 milliliters methacryloyl chloride. The condensation of the 1-(2-anthryl) ethanol and methacryloyl chloride is allowed to proceed for about 24 hours. After that time, the reaction between the 1-(2-anthryl) ethanol and methacryloyl chloride is quenched by the addition of water to the reaction medium. Sufficient water is added to extract unreacted methacryloyl chloride from the reaction mass. The precipitate which forms is separated from the reaction medium by filtration, dried in a vacuum oven and recrystallized from a mixed solvent of benzene and methanol.

EXAMPLES II – VII

The monomer synthesis of Example I is repeated except for the substitution of the following acylating agents for acetic anhydride.

| Example No. | Acylating Agent |
| --- | --- |
| II | formyl chloride |
| III | acetyl chloride |
| IV | propionyl chloride |
| V | butyryl chloride |
| VI | valeryl chloride |
| VII | caproyl chloride |

EXAMPLE VIII

Synthesis of 2,4,7-trinitro-9-fluorenyl methacrylate 2,4,7-trinitro-9-fluorenone is contacted with stoichiometric quantities of hydrazine in an appropriate solvent, heated to a temperature in a range of from about 80° to about 85° C and the materials allowed to react for a period of at least 2 hours. At the end of this interval, the desired product forms a precipitate which can be separated from the unreacted materials and solvent vehicle by simple filtration techniques. The product which is recovered can be subsequently purified by washing in an appropriate solvent. Chemical analysis of the product confirms it to be the 9-hydrazone derivative of 2,4,7-trinitro-9-fluorenone. Following air drying, this 9-hydrazone derivative is placed in a reaction vessel with a stoichiometric excess of argentous oxide, and sufficient tetrahydrofuran added to dissolve these materials. The solution is then heated to boiling under reflux conditions for a period of about 5 hours. The precipitate which forms during this reaction is separated from the solution by filtration and discarded. The liquid of the solution is then evaporated sufficiently until crystallization of 9-diazo product occurs. Such crystals are separated from the liquid by filtration and purified by recrystallization from nitromethane. Chemical analysis of the purified product indicates it to be the 9-diazo derivative of 2,4,7-trinitro-9-fluorenone.

About 10 parts of this 9-diazo derivative is suspended in 150 milliliters of tetrahydrofuran and methacrylic acid added, the quantity of methacrylic acid being 7 fold the stoichiometric amounts required for esterification with the 9-diazo compound. Subsequent to addition of the methacrylic acid to the reaction medium, boron trifluoride etherate is added to the contents of the reaction vessel. The gram equivalent molecular weight of the boron trifluoride etherate is equivalent to the gram equivalent molecular weight of the 9-diazo compound. The contents of the reaction vessel are allowed to react at room temperature for a period of about 1 hour. The liquid phase of the reaction mass is removed by rotary evaporation at 50° C. The yellowish solid which is recovered is subsequently washed in 150 milliliters of water with vigorous agitation for a period of 2 hours. The solids are then removed from the aqueous solution by filtration, dried, and dissolved in 50 milliliters benzene. The solution is heated to boiling under reflux conditions, the particulates which precipitate are removed by filtration and discarded and the remaining liquid evaporated to an oily residue which eventually crystallizes. These crystals are purified by washing with ether. Chemical analysis indicates the crystalline product to be 2,4,7-trinitro-9-fluorenyl methacrylate, m.p. 143°–145° C.

EXAMPLE IX

About 2 grams of the monomer of Example I (5 × $10^{-3}$ moles) and 1.5 grams of the monomer of Example VIII (5 × $10^{-3}$ moles) are dissolved in 20 milliliters of reagent grade acetone. About 0.5 weight percent azobisisobutyronitrole is now added to the monomer charge, the tube containing the monomer charge taken through two freeze/thaw cycles, the tube sealed, and polymerization carried out on a hot water bath at 60° C for 18 hours. At the end of this interval, the tube's contents are emptied into methanol, the polymer which precipitates separated by filtration, and purified by reprecipitation from tetrahydrofuran into hexane. Yield about 2 grams of poly[1-2(anthryl)-ethyl-methacrylateco-2,4,7-trinitro-9-fluorenyl methacrylate].

About 0.5 grams of the copolymer is dissolved in 5 milliliters of tetrahydrofuran and the resulting solution draw bar coated on a ball-grained aluminum substrate. The copolymer coating is allowed to dry in a vacuum until substantially free of solvent residues. The electrophotographic response of this copolymer film is then determined by conventional techniques using both positive and negative charging techniques. In each instance, the electrophotographic response of the film is satisfactory and the images produced during such evaluation of acceptable quality.

EXAMPLE X

The procedures of Example IX are repeated except for the addition of 5 × $10^{-3}$ moles methylmethacrylate to the monomer charge prior to initiation of copolymerization. The resulting product obtained from this synthesis is less highly colored than the copolymer product obtained in Example IX. About 0.5 grams of the terpolymer prepared as described above is dissolved in 5 milliliters of tetrahydrofuran and the resulting solution draw bar coated over a thin film of amorphous selenium which has been vacuum deposited upon a ball-grained aluminum plate. The thickness of the amorphous selenium layer is approximately 1 micron and the dry film thickness of the terpolymer coating approximately 5 microns. The terpolymer coating appears only slightly colored in contrast to the copolymer coating prepared by the procedures described in Example IX. The surface of the terpolymer coating is charged to a positive potential and image information projected onto its surface with light that has been filtered to prevent photoactivation of the terpolymer layer. The latent image pattern thus produced is rendered visible by development with polar liquid developer and thereafter transferred to a supportive substrate. The developer residue remaining on the surface of the polymer film are removed and the imaging process repeated except for the reversal in the polarity of the sensitizing charge and the reveral in the polarity of the charge on the developer materials. In both instances, copy quality is acceptable and reproducible.

What is claimed is:

1. An electrophotographic imaging member comprising a conductive substrate and a photoconductive insulating layer containing a copolymer of the formula:

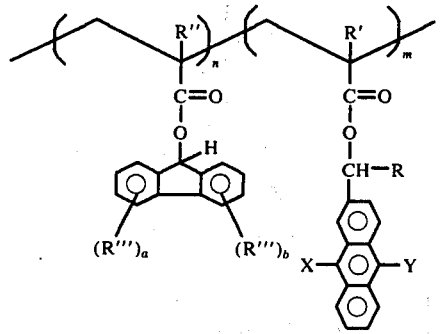

wherein
R is hydrogen or methyl;
R' is hydrogen or methyl; R'' is alkyl of 1 – 5 carbon atoms;
R''' is selected from the group consisting of $-NO_2$, halogen, $-CN$ and $-CF_3$;
X and Y are independently selected from the group consisting of hydrogen, chlorine, bromine, alkyl of 1 – 4 carbon atoms and phenyl;
a and b can range from 0 – 4; and
n can range from about 5 to about 95 percent of the total number of structural units of the copolymer; and
m can range from about 5 to about 95 percent of the total number of structural units of the copolymer.

2. The imaging member of claim 1 wherein the photoconductive insulating layer comprises a layer of photoconductive materials and contiguous therewith a charge carrier transporting layer containing the copolymer.

3. The imaging member of claim 2 wherein the layer of photoconductive material comprises amorphous selenium.

4. The imaging member of claim 2 wherein the layer of photoconductive materials comprises trigonal selenium.

5. The imaging member of claim 3 wherein the charge carrier transporting layer comprises a polymer having structural units from at least three distinct monomers, said polymer comprising from about 5 to about 90 percent structural units from the monomer

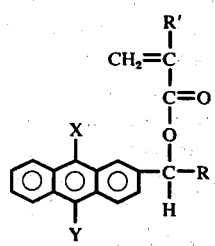

wherein
R is hydrogen or alkyl of 1–6 carbon atoms;
R' is hydrogen or methyl;
X and Y are independently selected from the group consisting of hydrogen, chlorine, bromine, alkykl of 1–4 carbon atoms and phenyl;
from about 5 to about 90 percent structural units from the monomer

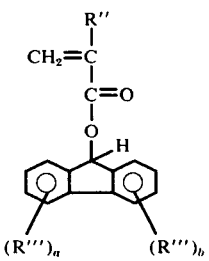

wherein
R'' is hydrogen or methyl;
R''' is selected from the group consisting of —NO$_2$, halogen —CN and —CF$_3$; and
a and b can range from 0–4 and from about 5 to 30 percent structural units from a monomer which is devoid of pendant group capable of charge transfer interaction with the pendant groups of either of the above monomers.

6. An electrophotographic imaging process comprising:
a. providing an electrophotographic imaging member having a photoconductive insulating layer containing a copolymer of the formula:

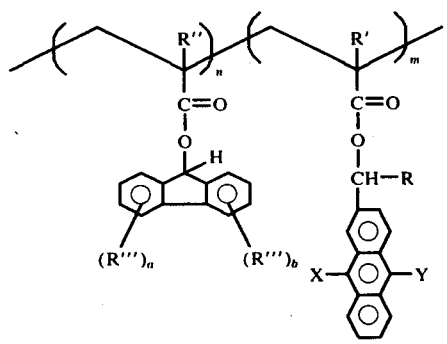

wherein
R is hydrogen or methyl;
R' is hydrogen or methyl;
R'' is alkyl of 1 – 5 carbon atoms;
R''' is selected from the group consisting of —NO$_2$, halogen, —CN and —CF$_3$;
X and Y are independently selected from the group consisting of hydrogen, chlorine, bromine, alkyl of 1 – 4 carbon atoms and phenyl;
a and b can range from 0 – 4; and
n can range from about 5 to about 95 percent of the total number of structural units of the copolymer; and m can range from about 5 to about 95 percent of the total number of structural units of the copolymer; and
b. forming an electrostatic latent image on said member.

7. The process of claim 6 wherein the photoconductive insulating layer comprises a layer of photoconductive materials and contiguous therewith a charge carrier transporting layer containing the copolymer.

8. The process of claim 7 wherein the layer of photoconductive material comprises amorphous selenium.

9. The process of claim 7 wherein the layer of photoconductive material comprises trigonal selenium.

10. The imaging process of claim 7 wherein the charge carrier transporting layer comprises a polymer having structural units from at least three distinct monomers, said polymer comprising from about 5 to 90 percent structural units from the monomer

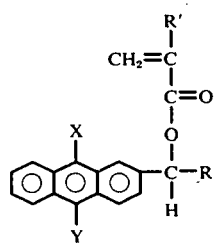

wherein
R is hydrogen or alkyl of 1–6 carbon atoms;
R' is hydrogen or methyl;
X and Y are independently selected from the group consisting of hydrogen, chlorine, bromine, alkyl of 1–4 carbon atoms and phenyl;
from about 5 to about 90 percent structural units from the monomer

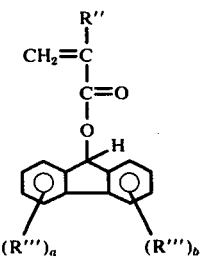

wherein
R'' is hydrogen or methyl;
R''' is selected from the group consisting of —NO$_2$, halogen, —CN and CF$_3$;
a and b can range from 0–4; and
from about 5 to 30 percent structural units from a monomer which is devoid of pendant group capable of charge transfer interaction with the pendant groups of either of the above monomers.

* * * * *